Sept. 23, 1930.  E. E. HEWITT  1,776,257
BRAKE RIGGING DEVICE
Filed April 16, 1928
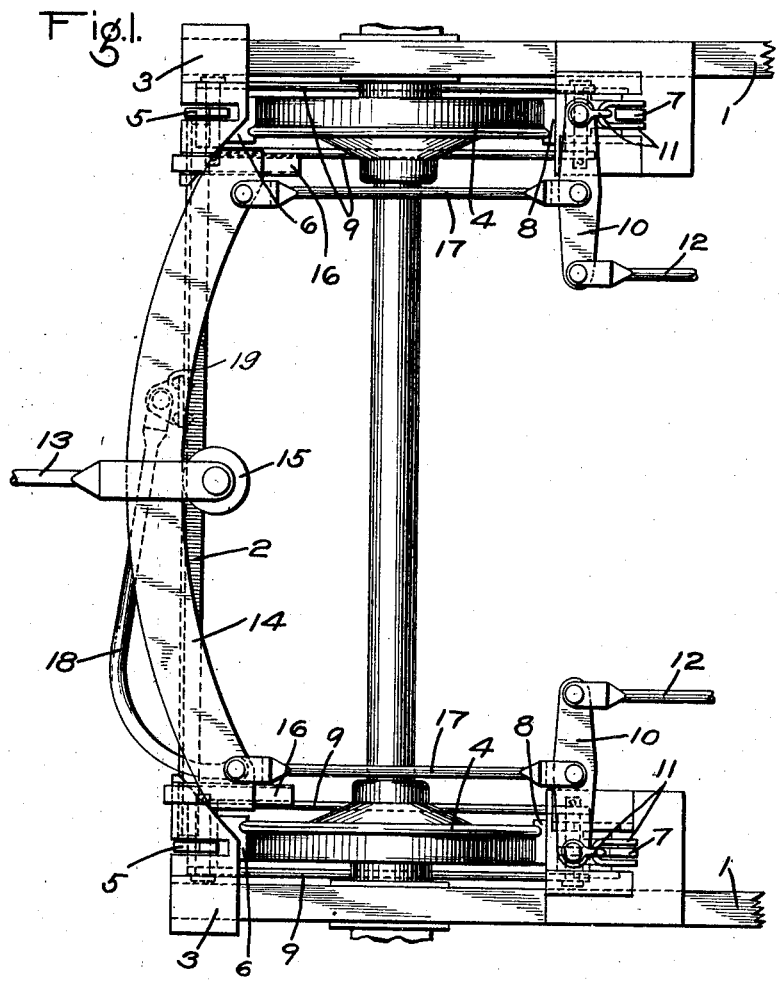
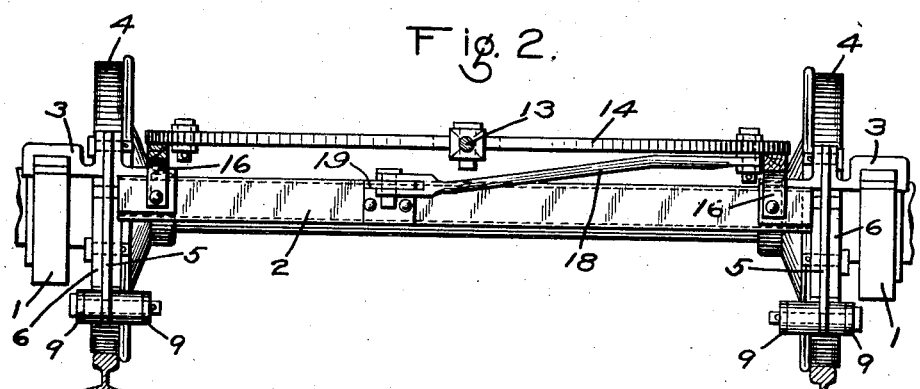
INVENTOR
ELLIS E. HEWITT
BY Wm. M. Cady
ATTORNEY Patented Sept. 23, 1930

1,776,257

UNITED STATES PATENT OFFICE

ELLIS E. HEWITT, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

BRAKE-RIGGING DEVICE

Application filed April 16, 1928. Serial No. 270,292.

This invention relates to railway car brakes and more particularly to those portions of the brakes which are carried by the car trucks and has for its principal object to provide means for holding the radius bar of the brake against excessive sidewise movement relative to the car truck frame.

In the accompanying drawing; Fig. 1 is a plan view of a portion of a railway car truck and brake embodying my invention; and Fig. 2 is an end elevational view of the same.

The truck may be of any desired construction, but for illustrative purposes, has been shown in the drawing as comprising spaced longitudinally extending side frames 1 and transversely extending end frame members 2, only one of which latter members are shown. This end frame member 2 is connected to the ends of the side frames by brackets 3 or any other desired means. The truck frame as a whole is carried, in the usual manner by the axles having the car wheels 4 mounted thereon.

The truck brake may be of any desired construction but as shown in the drawing comprises two sets of connected levers and rods, there being one set at each side of the truck. Each set of levers may comprise a vertically disposed brake lever 5 having mounted thereon a brake shoe 6 adapted to engage one side of one of the wheels 4, and a vertically disposed brake lever 7 having mounted thereon a brake shoe 8 adapted to engage the opposite side of the same wheel. The lever 5 adjacent its upper end may be fulcrumed to one of the brackets 3 and the lever 7 may be fulcrumed intermediate its ends to one of the side frames in any desired manner. The lower ends of these levers are operatively connected by longitudinally extending rods 9. The upper end of the lever 7 is operatively connected to one end of a horizontally disposed equalizing lever 10 by connected clevises 11. The other end of the lever 10 is connected to a brake rod 12 which extends rearwardly and may be connected to other levers in the set in the usual manner.

For the purpose of transmitting power from the usual pull rod 13 to both sets of brake levers and rods of the truck, a curved horizontally disposed radius bar 14 is provided, with which a roller 15 on the pull rod 13 engages.

The radius bar 14 is movable back and forth in directions longitudinally of the truck in operating the brakes and is slidably supported upon brackets 16 secured to one of the end frame members 2.

In the present embodiment of the invention, each end of the radius bar is connected to one of the equalizing levers 10, intermediate its ends, by a rod 17.

For the purpose of preventing undue sidewise movement of the radius bar, relative to the truck frame, a connection from the radius bar to the truck frame is provided, which connection is in the form of a rod 18, the outer end of which is operatively connected to the radius bar adjacent its outer end, the inner end being pivotally connected with a bracket 19 secured to the end frame member 2. The bracket 19 is preferably arranged adjacent the longitudinal center line of the truck, but it will be understood that it may be placed at any other desired location. However, the further the bracket is placed away from the outer end of the rod 18, the less will be the radial movement imparted to the radius bar when the brakes are operated.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. In a brake rigging, the combination with a car truck frame, of a radius bar operatively carried by said truck frame, and a connection between said radius bar and truck frame adapted to maintain said bar against undue movement transversely of the truck, said connection extending longitudinally of said bar.

2. In a brake rigging, the combination with a car truck, of a plurality of connected brake levers and rods carried by said truck, a radius bar for transmitting braking forces to said levers and rods, and a connection from said bar to said truck, said connection extending transversely of the truck.

3. In a brake rigging, the combination with a car truck, of a plurality of connected brake levers and rods carried by said truck, a radius bar for transmitting braking forces to said levers and rods, and means extending transversely of the truck and operatively connecting said bar to said truck, said means being adapted to maintain said bar against excessive movement transversely of the truck.

4. In a brake rigging, the combination with a car truck, of a radius bar forming part of said brake rigging and slidably mounted on said truck, and a connection from said bar to a fixed portion of said truck for maintaining said bar against movement transversely of the truck.

5. In a brake rigging, the combination with a car truck, of a radius bar forming part of said brake rigging, and a bar extending in a direction transversely of the truck having one end pivotally connected with the truck and the other end pivotally connected to one of the end portions of said bar.

In testimony whereof I have hereunto set my hand.

ELLIS E. HEWITT.